United States Patent [19]
Liao

[11] Patent Number: 5,058,319
[45] Date of Patent: Oct. 22, 1991

[54] FLOWERPOT HAVING A WATER RESERVOIR

[76] Inventor: Wan M. Liao, No. 200, Heng Chun Rd., Ta Chia Chen, Taichung Hsien, Taiwan

[21] Appl. No.: 582,743

[22] Filed: Sep. 14, 1990

[51] Int. Cl.⁵ .............................................. A01G 9/02
[52] U.S. Cl. ............................................. 47/81; 47/79
[58] Field of Search ..................................... 47/81, 79

[56] References Cited

U.S. PATENT DOCUMENTS

| | | | |
|---|---|---|---|
| 2,288,678 | 7/1942 | Blumentritt | 47/79 |
| 2,983,076 | 5/1961 | Merrill | 47/79 |
| 3,137,096 | 6/1964 | Hopkins | 47/79 |
| 3,576,088 | 4/1971 | Arca | 47/81 |
| 4,903,432 | 2/1990 | Velagaleti et al. | 47/81 |

FOREIGN PATENT DOCUMENTS

| | | | |
|---|---|---|---|
| 79473 | 9/1976 | Australia | 47/81 |
| 1439051 | 4/1966 | France | 47/79 |
| 8702637 | 6/1988 | Netherlands | 47/79 |
| 582984 | 12/1976 | Switzerland | 47/81 |

*Primary Examiner*—David A. Scherbel
*Assistant Examiner*—Joanne C. Downs
*Attorney, Agent, or Firm*—Bacon & Thomas

[57] ABSTRACT

A flowerpot has a tube extending upwardly from a bottom. The tube has an open top. An annular space is formed around the tube for storing water flowing into the flowerpot. A partition plate and a screen are supported above the tube. One or more notches are formed in the screen and the partition plate. A sponge is engaged in each of the notches. An upper half of each sponge extends above the screen, and a lower half of each sponge extends into the annular space. The sponges absorb the water stored in the annular space and supply the water to the space above the screen.

2 Claims, 7 Drawing Sheets

FLOWERPOT HAVING A WATER RESERVOIR

BACKGROUND OF THE INVENTION

The present invention relates to a flowerpot, and more particularly to a flowerpot having a water reservoir for storing water.

Generally, plants are directly planted within the flowerpots which have no water reservoirs so that the planters have to sprinkle water almost everyday in order to keep the plants alive. On the contrary, when excessive water is poured into and stored in the flowerpots, the plants may also die because the root portions of the plants will be immersed in water.

The present invention has arisen to mitigate and/or obviate the afore-described disadvantages of the conventional flowerpots.

SUMMARY OF THE INVENTION

The primary objective of the present invention is to provide a flowerpot having a water reservoir which stores a certain amount of water and gradually supplies the water to the plants planted therein.

Another objective of the present invention is to provide a flowerpot having a water reservoir which has a spillway provided for spilling of water when excessive water is poured into the flowerpot.

In accordance with one aspect of the invention, there is provided a flowerpot which has a tube extended upward from a bottom. The tube has an open top. An annular space is formed around the tube for storing water flowing into the flowerpot. A number of stops are fixed to an inner surface of the flowerpot and are disposed above the open top of the tube. A partition plate is supported on the stops. A number of apertures are formed in the partition plate. One or more notches are formed in the partition plate. A screen is supported on the partition plate. One or more notches are formed in the screen and are aligned with the notches of the partition plate. A sponge member is engaged in each pair of aligned notches. An upper half of each of the sponge members is extended to a space above the screen, and a lower half of each of the sponge members is extended downward into the annular space. The sponge members absorb the water stored in the annular space and supply the water to the space above the screen.

Further objectives and advantages of the present invention will become apparent from a careful reading of the detailed description provided hereinbelow, with appropriate reference to the accompanying drawings, wherein like parts are referred to and indicated by like reference characters, and wherein:

DETAILED DESCRIPTION OF THE INVENTION

Figure 1:
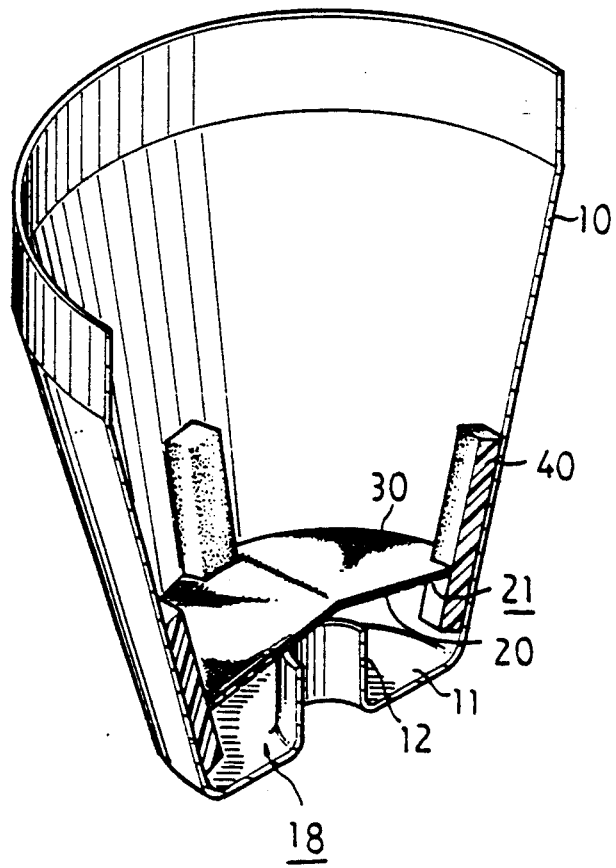
FIG. 1 is a perspective view of a flowerpot in accordance with one embodiment of the present invention, in which, for clearance illustration purposes, half of the flowerpot is cut away.
Figure 2:
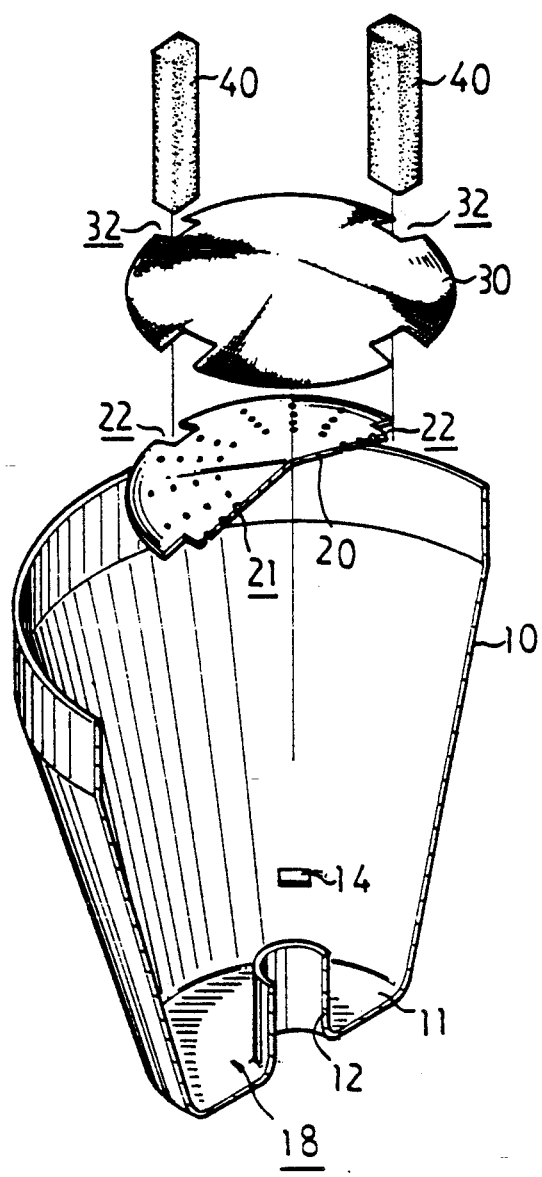
FIG. 2 is an exploded view of the flowerpot.

Referring to the drawings and initially to FIGS. 1 and 2, the flowerpot in accordance with one embodiment of the present invention comprises generally a body 10 which has an open top, a tube 12 extended upward from the bottom 11 of the body 10, a partition plate 20, a screen 30 and four sponge members 40.

The tube 12 has an open top. A plurality of stops 14 are fixed to the inner surface of the body 10 and are preferably equally spaced. The stops 14 are disposed and located slightly above the top of the tube 12. The peripheral edge of the partition plate 20 is supported on the stops 14. The lower surface of the partition plate 20 and the top end of the tube 12 have a small distance apart. A plurality of apertures 21 are formed and distributed in the partition plate 20. Four notches 22 which are equally spaced are formed on the peripheral edge of the partition plate 20. Four notches 32 which are equally spaced are formed on the peripheral edge of the screen 30 which is supported upon the partition plate 20. The notches 22 and 32 of the partition plate 20 and the screen 30 are aligned. One sponge member 40 which is substantially of a rectangular parallelepiped configuration is engaged in each pair of the notches 22, 32.

Figure 3:
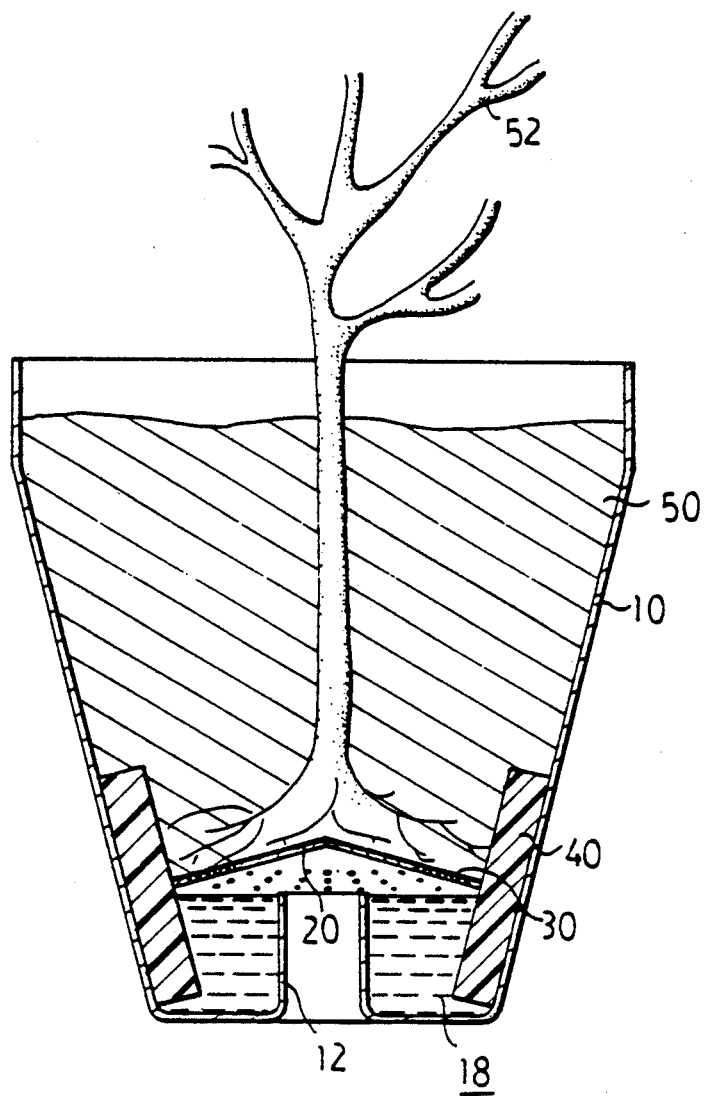
FIG. 3 is a cross sectional view of the flowerpot, in which a plant is planted therein.
Figure 4:
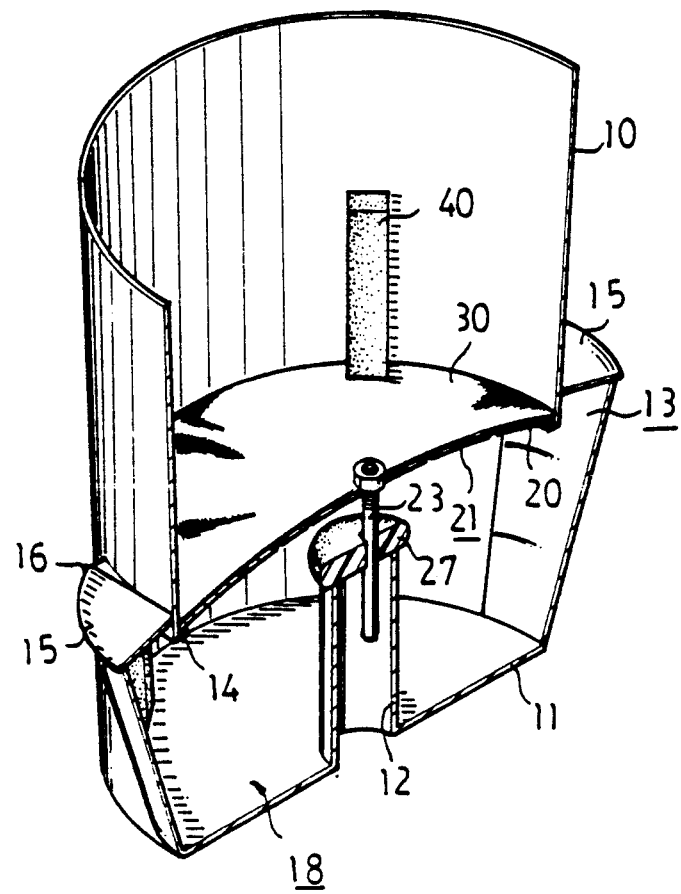
FIG. 4 is a perspective view of a flowerpot in accordance with another embodiment of the present invention, in which, for clearance illustration purposes, half of the flowerpot is cut away.
Figure 5:
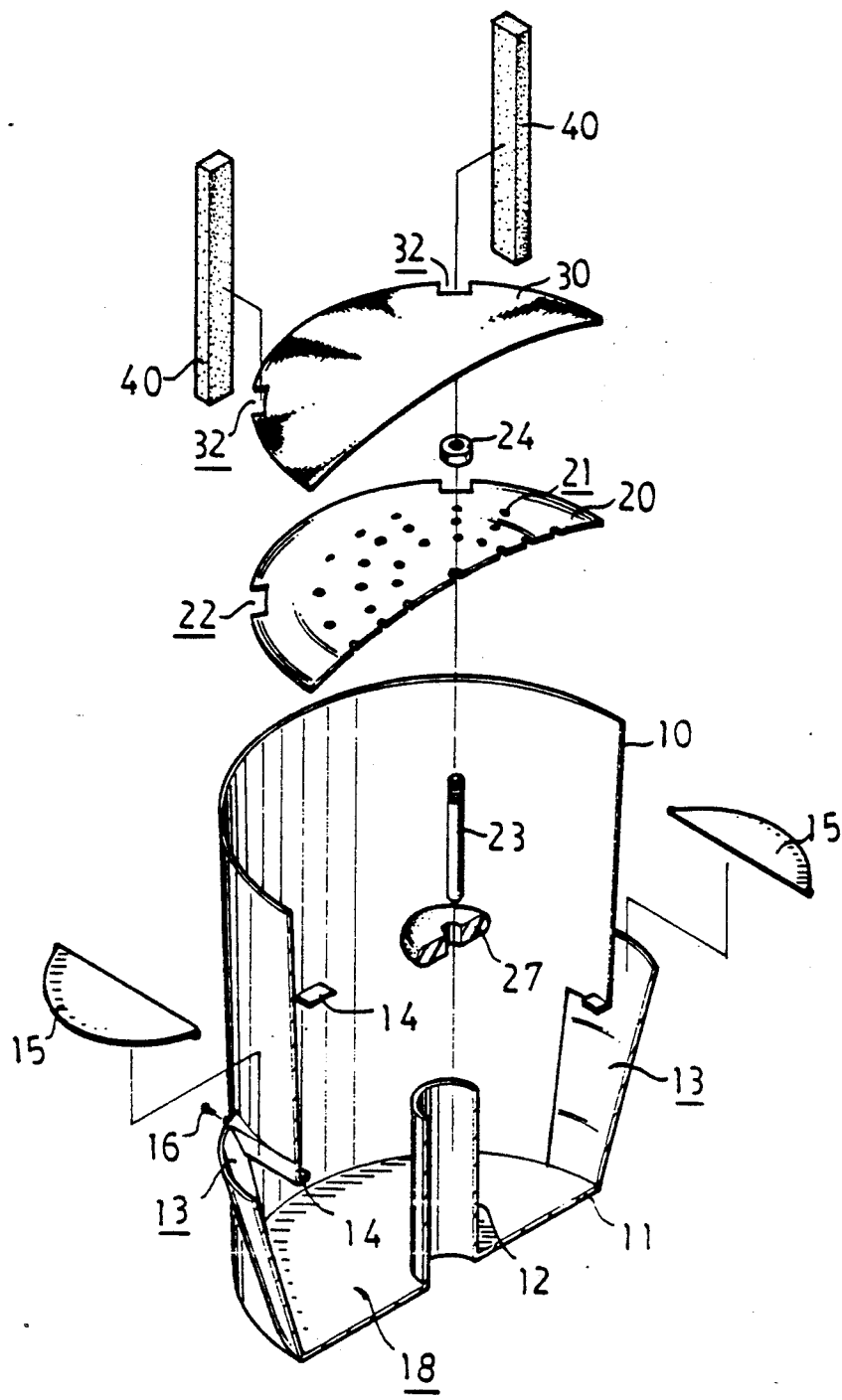
FIG. 5 is an exploded view of the flowerpot of FIG. 4.

Referring next to FIG. 3, a plant 52 is planted in the filler materials 50, such as soil or the like which is filled within the body 10. When water is sprinkled or poured into the body 10, the water may permeate through the filler material 50, the screen 30, and the apertures 21 of the partition plate 20 and flow into the annular space 18 formed around the tube 12. The annular space 18 forms a water reservoir for storing water poured into the body 10. When excessive water is poured into the body 10, the water may spill from the top of the tube 12 so that the tube 12 acts as a spillway for excessive water. The upper halves of the sponge members 40 are embedded in the filler materials 50, and the lower halves thereof are immersed in the water which is stored within the annular space 18. The sponge members 40 may absorb the water so that the water may permeate to the soil 50.

Referring next to FIGS. 4 to 7, illustrated is another embodiment of the present invention. In this embodiment, the general structure of the flowerpot is similar to that of the flowerpot as shown in FIGS. 1 to 3. Two channels 13 are oppositely formed in the lower end portion of the body 10 and inclined outward. Each channel 13 has an open top and is communicated with the annular space 18. A flap 15 is pivoted to the open end of each of the channels 13 by a pivot axle 16. An upper end of a bolt 23 is fixed to a center of the partition plate 20 by a nut 24, and the lower portion of the bolt 23 extends through a float 27 into the tube 12. The float 27 is guided to move up and down along the bolt 23.

Figure 6:
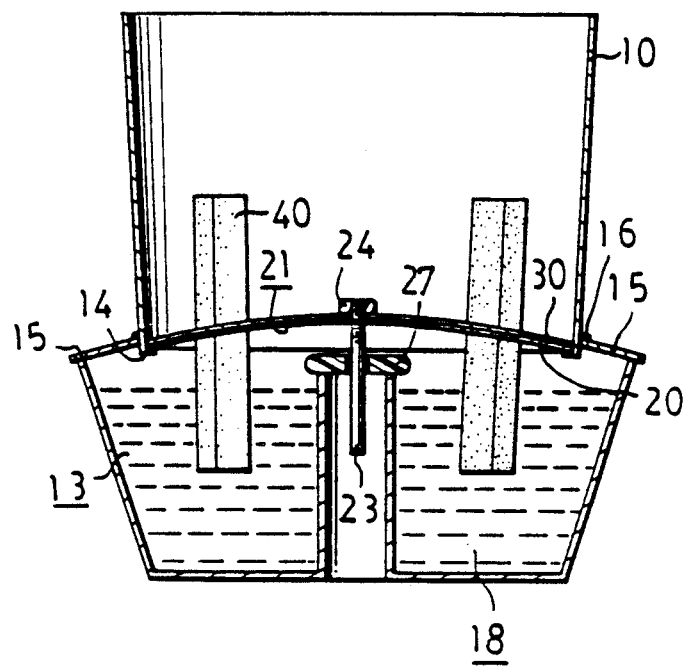
FIG. 6 is a cross sectional view of the flowerpot of FIG. 4.

As shown in FIG. 6, when the water level in the annular space 18 is lower than the top of the tube 12, the flaps 15 and the float 27 move downward by gravity force so that the flaps 15 close the open top ends of the channels 13 and the float 27 close the open top end of the tube 12. Accordingly, dirt, insects or the like may not enter the annular space 18 so that the water stored in the annular space may be kept clean.

Figure 7:
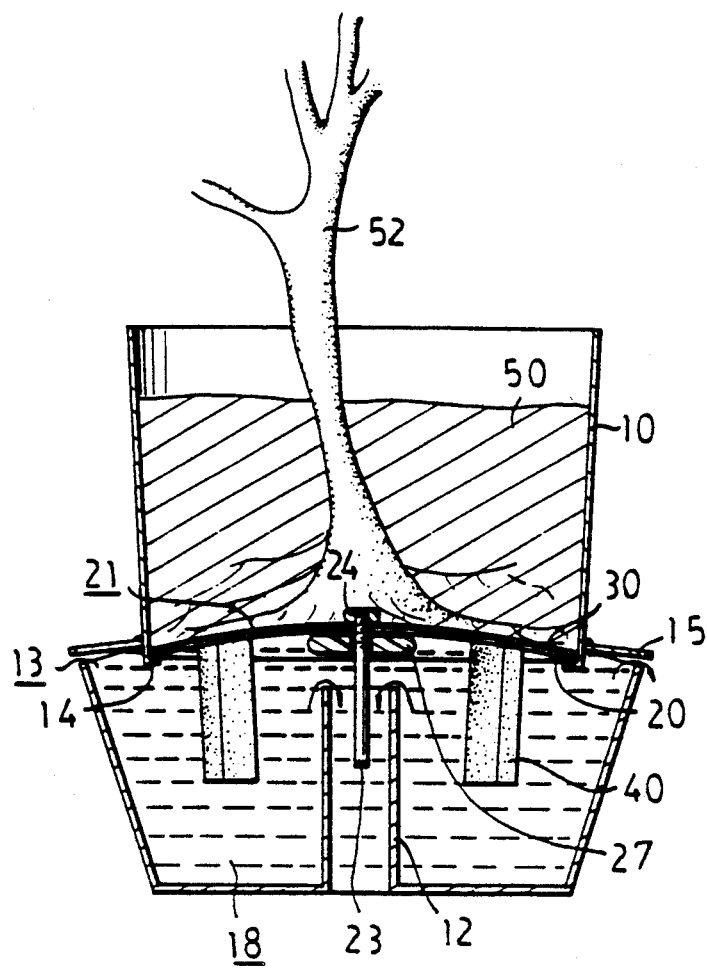
FIG. 7 is a cross sectional view of the flowerpot of FIG. 4, in which a plant is planted therein.

However, as shown in FIG. 7, when excessive water is poured into the body and flows into the annular space 18, the flaps 15 are pushed upward by the water and the float 27 is buoyant on water so that excessive water may flow out of the channel 13 or flow out through the tube 12.

Accordingly, the flowerpot in accordance with the present invention has a water reservoir provided for storing a certain amount of water and gradually supplies the water to the plants planted therein. In addition, the flowerpot has a spillway provided for spilling of water when excessive water is poured into the flowerpot.

Alternatively, the sponge members 40 may be disposed in a middle portion of the screen 30 and the partition plate 20. The only requirement is that the upper halves of the sponge members 40 are embedded in the soil 50 and the lower halves thereof are immersed in the water stored in the annular space 18.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A flowerpot comprising:
   a) a body including an inner surface and a bottom;
   b) a tube extending upwardly from the bottom of the body, the tube including an open top and defining an annular space with the inner surface of the body for storing water flowing into the body;
   c) a plurality of stops peripherally secured to the inner surface of the body and positioned above the open top of the tube;
   d) a partition plate supported on the stops, the partition plate including a lower surface, a plurality of apertures and at least one first notch formed therein, the lower surface being positioned above the open top of the tube;
   e) a screen supported on the partition plate, at least one second notch formed in the screen, and the second notch being disposed in alignment with the first notch;
   f) a sponge member engaged in the aligned first and second notches, the sponge member including an upper half extending upwardly above the screen and a lower half extending downwardly into the annular space, the sponge member for absorbing the water stored in the annular space and supplying the water to the space above the screen;
   g) a bolt including an upper end and a lower portion, the upper end of the bolt being connected to the partition plate and the screen at central portions thereof, the lower portion of the bolt extending into the tube; and
   h) a float, the lower portion of the bolt extending through the float whereby the float is guided by the bolt to move upwardly and downwardly therealong, the float being movable downwardly by gravity to close the open end of the tube when the water level in the body is lower than the open top of the tube, and the float being movable, upwardly by water when the water level is higher than the open top of the tube for permitting excess water to flow out through the open top of the tube.

2. A flowerpot comprising:
   a) a body including an inner surface and a bottom;
   b) a tube extending upwardly from the bottom of the body, the tube including an open top and defining an annular space with the inner surface of the body for storing water flowing into the body;
   c) a plurality of stops peripherally secured to the inner surface of the body and positioned above the open top of the tube;
   d) a partition plate supported on the stops, the partition plate including a lower surface, a plurality of apertures and at least one first notch formed therein, the lower surface being positioned above the open top of the tube;
   e) a screen supported on the partition plate, at least one second notch formed in the screen, and the second notch being disposed in alignment with the first notch;
   f) a sponge member engaged in the aligned first and second notches, the sponge member including an upper half extending upwardly above the screen and a lower half extending downwardly into the annular space, the sponge member for absorbing the water stored in the annular space and supplying the water to the space above the screen;
   g) the body including a lower portion, at least one channel formed in the lower portion. the channel being inclined in an outward direction and including an open upper end; and
   h) a flap pivotally secured to the open upper end of the channel, the flap movable downwardly by gravity to close the open upper end of the channel when the water level is lower than the open upper end of the channel, and the flap being movable upwardly by water when the water level is higher than the open upper end of the channel for permitting excess water to flow out from said channel.

* * * * *